United States Patent
Choi

(10) Patent No.: US 9,549,165 B2
(45) Date of Patent: Jan. 17, 2017

(54) METHOD FOR DISPLAYING THREE-DIMENSIONAL USER INTERFACE

(75) Inventor: Sung Ho Choi, Gyeonggi-do (KR)

(73) Assignee: LG ELECTRONICS, INC., Seoul (KR)

( * ) Notice: Subject to any disclaimer, the term of this patent is extended or adjusted under 35 U.S.C. 154(b) by 910 days.

(21) Appl. No.: 12/791,319

(22) Filed: Jun. 1, 2010

(65) Prior Publication Data

US 2011/0010666 A1    Jan. 13, 2011

Related U.S. Application Data

(60) Provisional application No. 61/223,385, filed on Jul. 7, 2009.

(51) Int. Cl.
*H04N 13/04* (2006.01)
*H04N 13/00* (2006.01)

(52) U.S. Cl.
CPC ........ *H04N 13/0022* (2013.01); *H04N 13/007* (2013.01); *H04N 13/0011* (2013.01); *H04N 13/04* (2013.01); *H04N 2013/0465* (2013.01)

(58) Field of Classification Search
CPC .. G06F 3/0481; G06F 3/0482; G06F 3/04817; G06F 3/04815; G06F 9/4443; G06F 3/0236; H04N 21/482; H04N 5/44543; H04N 13/0055; H04N 13/0239; H04N 13/0059; H04N 13/0048; H04N 13/0404; H04N 13/0409; H04N 13/0497; G02B 27/22; G02B 6/12002; G02B 27/2214
USPC ............... 715/782, 810, 836, 848, 850, 851; 348/42, 569
See application file for complete search history.

(56) References Cited

U.S. PATENT DOCUMENTS

| | | | |
|---|---|---|---|
| 5,880,729 A | 3/1999 | Johnston, Jr. et al. | |
| 6,157,383 A | 12/2000 | Loop | |
| 6,621,509 B1* | 9/2003 | Eiref et al. | 715/836 |
| 7,441,201 B1 | 10/2008 | Printezis | 715/762 |
| 7,685,619 B1 | 3/2010 | Herz | |
| 2004/0070673 A1 | 4/2004 | Nakamura | |
| 2004/0100479 A1* | 5/2004 | Nakano et al. | 345/700 |
| 2006/0139448 A1 | 6/2006 | Ha et al. | |
| 2006/0192776 A1* | 8/2006 | Nomura et al. | 345/419 |
| 2006/0253802 A1* | 11/2006 | Kim | 715/836 |
| 2007/0003134 A1* | 1/2007 | Song et al. | 382/154 |
| 2007/0121182 A1 | 5/2007 | Fukushima et al. | |
| 2007/0165027 A1* | 7/2007 | Nakadaira et al. | 345/426 |

(Continued)

FOREIGN PATENT DOCUMENTS

| | | |
|---|---|---|
| CN | 1497923 A | 5/2004 |
| CN | 1859549 | 11/2006 |

(Continued)

OTHER PUBLICATIONS

Office Action for U.S. Appl. No. 12/792,386 dated Jul. 31, 2012.

(Continued)

*Primary Examiner* — Jeffrey A Gaffin
*Assistant Examiner* — Rinna Yi
(74) *Attorney, Agent, or Firm* — KED & Associates, LLP

(57) ABSTRACT

A method is provided that includes displaying a user interface including at least one menu item using at least one of first image data or second image data, receiving a signal related to the at least one menu item, and changing a spacing of the first image data and the second image data displayed on a screen in response to the received signal such that a change of depth of the menu item is perceived by a viewer.

5 Claims, 13 Drawing Sheets

(56) References Cited

U.S. PATENT DOCUMENTS

| | | | |
|---|---|---|---|
| 2007/0274672 A1 | 11/2007 | Itoi | |
| 2007/0300184 A1 | 12/2007 | Song | 715/810 |
| 2008/0122837 A1* | 5/2008 | Woo | G06F 9/4443 345/419 |
| 2008/0240549 A1* | 10/2008 | Koo et al. | 382/154 |
| 2008/0252604 A1* | 10/2008 | Huang et al. | 345/172 |
| 2008/0309755 A1 | 12/2008 | Yoshida et al. | |
| 2008/0310499 A1* | 12/2008 | Kim et al. | 375/240.01 |
| 2009/0002368 A1 | 1/2009 | Vitikainen et al. | 345/422 |
| 2009/0116818 A1 | 5/2009 | Sasaki et al. | |
| 2009/0141172 A1 | 6/2009 | Liu | |
| 2009/0141180 A1 | 6/2009 | Kondo et al. | |
| 2009/0153737 A1 | 6/2009 | Glen | 348/571 |
| 2009/0217187 A1* | 8/2009 | Kendall et al. | 715/765 |
| 2009/0263007 A1 | 10/2009 | Kitaura et al. | |
| 2010/0026790 A1 | 2/2010 | Ohba et al. | |
| 2010/0039428 A1 | 2/2010 | Kim et al. | |
| 2010/0074584 A1 | 3/2010 | Jin et al. | |
| 2010/0118120 A1 | 5/2010 | Takahashi et al. | |
| 2010/0225645 A1 | 9/2010 | Suh et al. | |
| 2010/0225741 A1* | 9/2010 | Hong | H04N 13/0029 348/43 |
| 2010/0303442 A1* | 12/2010 | Newton et al. | 386/241 |
| 2012/0162367 A1 | 6/2012 | Ha | |
| 2012/0182402 A1 | 7/2012 | Hwangbo et al. | |

FOREIGN PATENT DOCUMENTS

| | | |
|---|---|---|
| CN | 1882106 A | 12/2006 |
| CN | 101015220 | 8/2007 |
| CN | 101282492 | 10/2008 |
| CN | 101448109 A | 6/2009 |
| EP | 1 187 495 | 3/2002 |
| JP | 2002-095014 | 3/2002 |
| JP | 2005-065162 | 3/2005 |
| JP | 2005-110121 | 4/2005 |
| KR | 10-2007-0052260 | 5/2007 |
| KR | 10-2008-0028366 | 3/2008 |
| KR | 10-2009-0004181 | 1/2009 |
| TW | 2009 20121 A | 5/2009 |
| WO | WO 01/31585 | 5/2001 |
| WO | WO 2008/001264 | 1/2008 |
| WO | WO 2008/013131 | 1/2008 |
| WO | WO 2008/033961 A2 | 3/2008 |
| WO | WO 2009/077927 A1 | 6/2009 |
| WO | WO 2009/077929 | 6/2009 |

OTHER PUBLICATIONS

European Search Report for Application PCT/KR2010/003451 dated Dec. 28, 2010.

European Search Report for Application PCT/KR2010/003452 dated Dec. 29, 2010.

European Search Report for Application PCT/KR2010/003009 dated Dec. 29, 2010.

D.D.R.J. Bolio, "Integration of 3D Video into the Blu-ray format," Master Thesis, Dept. of Mathematics and Computer Science, Technische universiteit Eindhoven, Eindhove, Oct. 2007.

Office Action dated Dec. 5, 2012 for U.S. Appl. No. 12/792,386.

Office Action dated Jul. 23, 2012 for U.S. Appl. 12/788,393.

U.S. Office Action for U.S. Appl. No. 12/792,386 dated Mar. 21, 2013.

U.S. Office Action for U.S. Appl. No. 12/788,393 dated May 8, 2013.

HDMI: "High Definition Multimedia Interface. Specification Version 1.4", Internet Citation, Jun. 5, 2009, 425 pages, XP009133650, Retrieved from the Internet: URL: http: / /wenku.baidu.com/view/e7db77d184254b35eefd34d0.html.

D.D.R.J. Bolio, "Integration of 3D video into the Blu-ray format", Master Thesis Technische Universiteit Eindhoven Department of Mathematics and Computer Science, Technische Universiteit Eindhoven, NL, Oct. 31, 2007, 118 pages (pages I-IX, 1, XP008148221), Retrieved from the Internet: URL: http:/ /alexandria.tue.nl/extral/afstversl/wsk-i/bolio2007.pdf.

European Search Report dated Jul. 11, 2013 issued in Application No. 10792258.5.

Chinese Office Action for Application 201080035859.6 dated Nov. 13, 2013 and English language translation.

Chinese Search Report for Application 201080035859.6 dated Nov. 13, 2013 and English language translation.

Chinese Office Action dated Mar. 5, 2014 issued in Application No. 201080046352.0 (with English translation).

Extended European Search Report for Application 10797238.2 dated Dec. 20, 2013.

Korean Notice of Allowance for Application 10-2012-7005784 dated Dec. 20, 2013.

U.S. Notice of Allowance for U.S. Appl. No. 12/792,386 dated Jan. 6, 2014.

U.S. Office Action for U.S. Appl. No. 12/788,393 dated Dec. 30, 2013.

"3D Active Button Magic" XP007922454 MultiMedia Soft Jan. 1, 2002 pp. 1-12.

Chinese Office Action for Application No. 201080028300.0 dated Apr. 30, 2014 and English language translation.

Chinese Office Action for Application No. 201080035859.6 dated May 9, 2014 and English language translation.

\* cited by examiner

FIG. 4
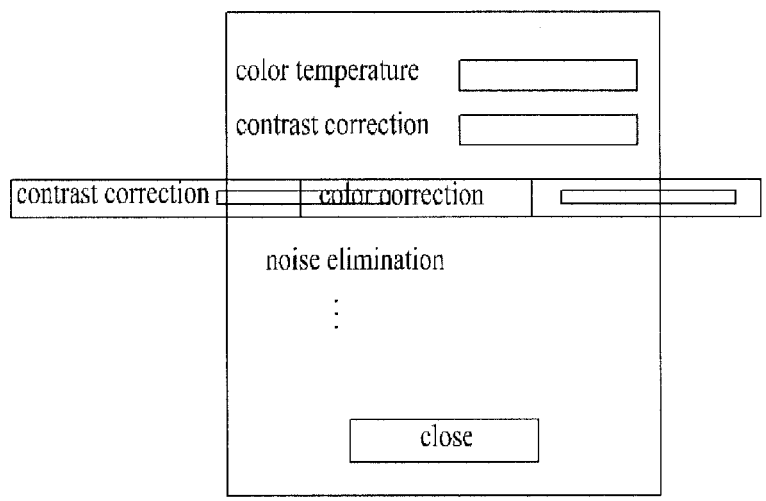
(a)
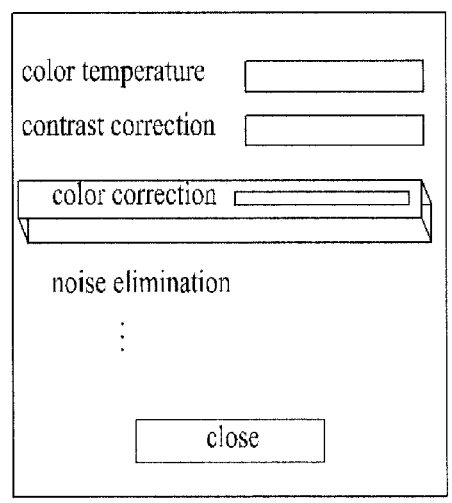
(b)

FIG. 8
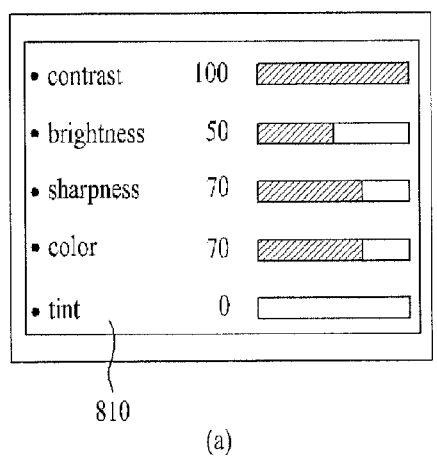
(a)
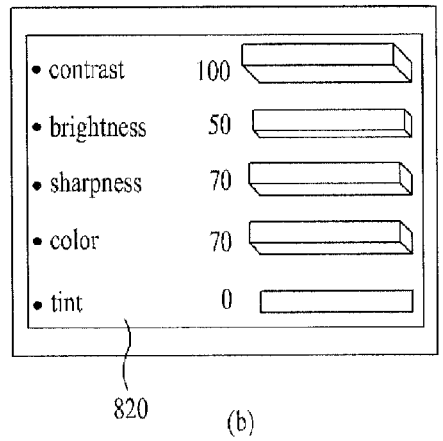
(b)
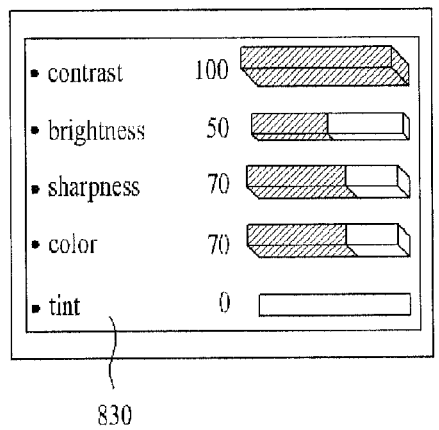
(c)
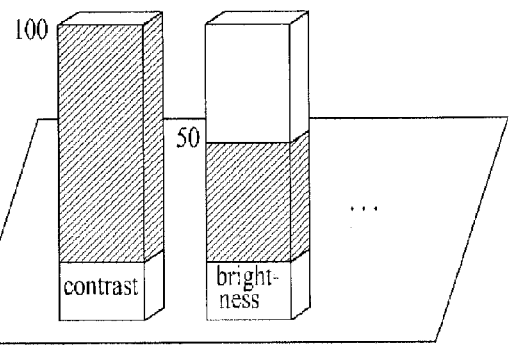
(d)

FIG. 9

(a)
Menu 1 depth

MenMdmdeptdepth
weight 1

(b)
Menu 2 depth

Menu 2depth2 depth
weight 2

(c)
Menu 3 depth

Menu 3 depMenu 3 depth
weight 3

(d)
Menu 4 depth

Menu 4 depth  Menu 4 depth
weight 4

FIG. 10
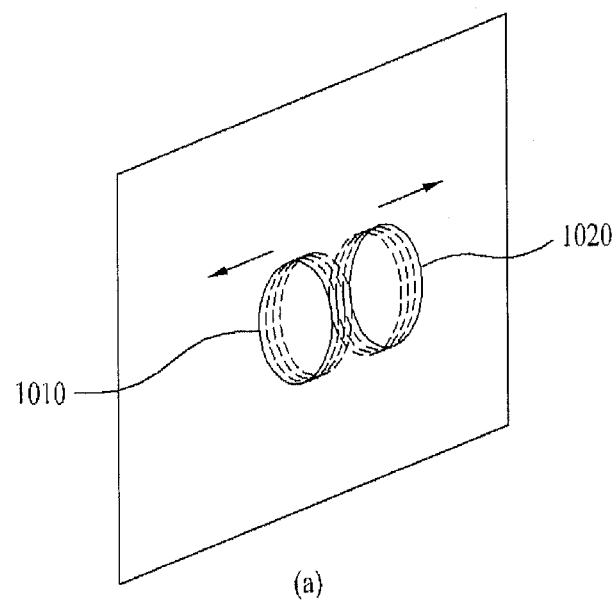
(a)
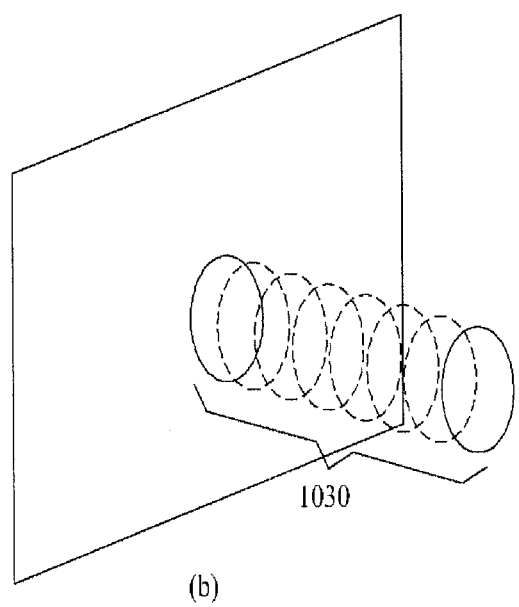
(b)

METHOD FOR DISPLAYING THREE-DIMENSIONAL USER INTERFACE

This application claims priority and benefit from U.S. Provisional Application No. 61/223,385, filed Jul. 7, 2009, the subject matter of which is hereby incorporated by reference.

BACKGROUND

1. Field

Embodiments of the present invention may relate to a method for displaying a three-dimensional (3D) User Interface (UI) and an apparatus for processing an image signal. More particularly, embodiments of the present invention may relate to a 3D UI displaying method and apparatus for indicating an item selected from a hierarchical 3D UI with an increased visibility.

2. Background

Along with growth of digital broadcasting, digital contents have been increased in amount and diversified, as compared to analog broadcasting.

While most digital contents are a two-dimensional (2D) content, more and more 3D content has been produced to allow a viewer to enjoy a 3D effect and a sense of reality. It is expected from this trend of 3D content will be enjoyed through a receiver at home.

A User Interface (UI) for assessing and controlling a broadcast receiver and contents may be used to form a two-dimensional (2D) UI. However, if a viewer selects a 3D content or a 3D mode, the viewer may feel confusion or an inconvenience because of the provided 2D UI.

When 2D content coexists with 3D content in received contents, a receiver may not identify and indicate the 3D contents when providing information about content to a viewer. Therefore, if the viewer selects 3D contents based on the contents information provided by the receiver without knowing that they are 3D contents, the viewer may view broken and/or flickering images.

BRIEF DESCRIPTION OF THE DRAWINGS

Arrangements and embodiments may be described in detail with reference to the following drawings in which like reference numerals refer to like elements and wherein:

FIG. 4 illustrates a method for controlling a depth of a 3D menu UI according to an exemplary embodiment of the present invention;

FIG. 8 illustrates a method for rendering a sense of volume according to a value in a 3D menu UI according to an exemplary embodiment of the present invention;

FIGS. 9 and 10 illustrate a method for configuring a 3D menu UI so that the 3D menu UI gets a 3D effect gradually according to an exemplary embodiment of the present invention;

DETAILED DESCRIPTION

Reference may now be made in detail to preferred embodiments of the present invention, examples of which may be illustrated in the accompanying drawings. The same reference numbers may be used throughout the drawings to refer to the same or like parts. In addition, although the terms are selected from generally known and used terms, some of the terms mentioned in the description of embodiments have been selected by the applicant at his or her discretion, the detailed meanings of which may be described in relevant parts of the description herein. Further, embodiments of the present invention may understood, not simply by the actual terms used but by the meaning of each term lying within.

A method for displaying a three-dimensional (3D) User Interface (UI) and an apparatus for processing a signal according to exemplary embodiments of the present invention may be described below in detail.

3D Menu UI Displaying Method

A signal processing apparatus may process 3D image data based on a stereoscopic principle. More specifically, left image data (or first image data) and right image data (or second image data) of one object may be created by capturing an object with two cameras at different positions and input perpendicularly to the human left and right eyes, respectively. Thus, the image data input through the left and right eyes may be combined into a 3D image in a brain of the viewer. When the left image data and the right image data are input perpendicularly, this means that the input data does not interfere each other.

Figure 1:
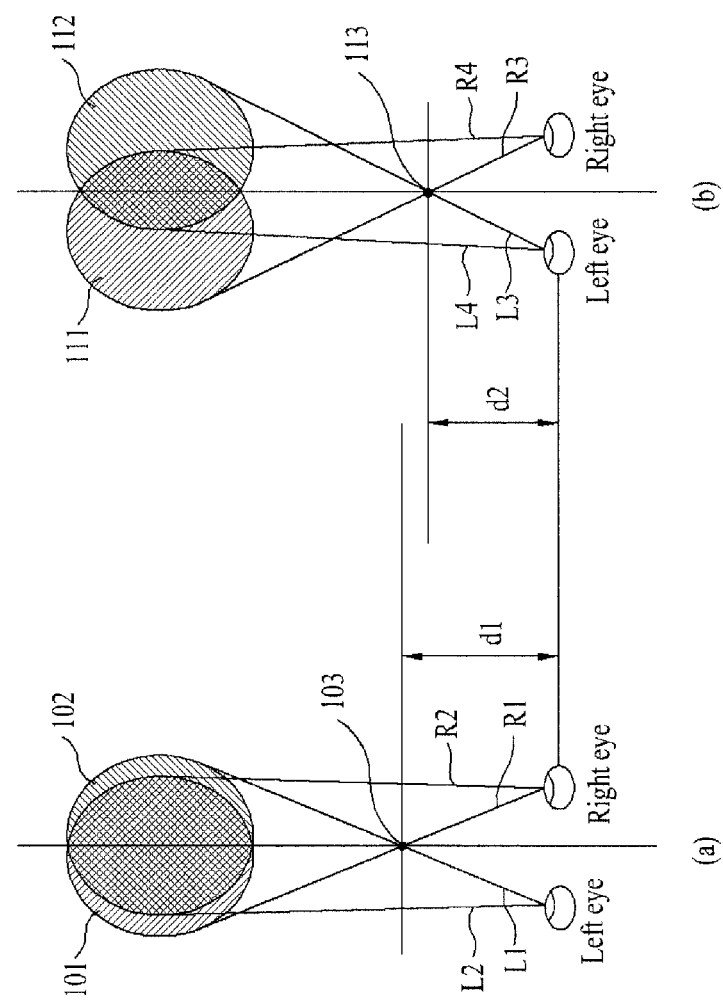
FIG. 1 is a view for describing a sense of perspective based on a spacing between left image data and right image data.

FIG. 1 is a view for describing a sense of perspective based on a spacing between left image data and right image data.

FIG. 1(A) illustrates a position 103 of an image formed by combining left image data 102 and right image data 101 that are spaced narrowly apart from each other. FIG. 1(B) illustrates a position 113 of an image formed by combining left image data 112 and right image data 111 that are laterally spaced apart from each other.

FIGS. 1(A) and 1(B) illustrate different senses of perspective that are felt from images that are formed at different positions according to distances between the left image data and the right image data in an image signal processing apparatus.

As shown in FIG. 1(A), if lines R1 and R2 extend along a line of sight from the right eye to both sides of the right image data 101 and lines L1 and L2 extend along a line of sight from the left eye to both sides of the left image data 102, an image may be formed at the intersection 103 between the line R1 and the line L1, spaced apart from the left and right eyes by a specific distance d1.

As shown in FIG. 1(B), when lines R3 and R4 and lines L3 and L4 extend in a same manner as described above with reference to FIG. 1(A), an image may be formed at the intersection 113 between the line R3 and the line L3, spaced apart from the left and right eyes by a specific distance d2.

The distance d1 is greater (or larger) than the distance d2. This implies that the image is formed farther from the left and right eyes in FIG. 1(A) than in FIG. 1(B).

The distance from the image to the left and right eyes may depend on lateral spacing between the left and right image data along a horizontal direction in FIGS. 1(A) and 1(B).

For example, the spacing between the left image data 102 and the right image data 101 in FIG. 1(A) may be narrower than the spacing between the left image data 112 and the right image data 114 in FIG. 1(B).

Accordingly, as spacing between the left image data and the right image data is decreased, an image obtained by combining the left image data and the right image data may be perceived as being farther from the human eye.

Based on this principle, a sense of depth may be applied when a 3D menu UI is configured.

Figure 2:
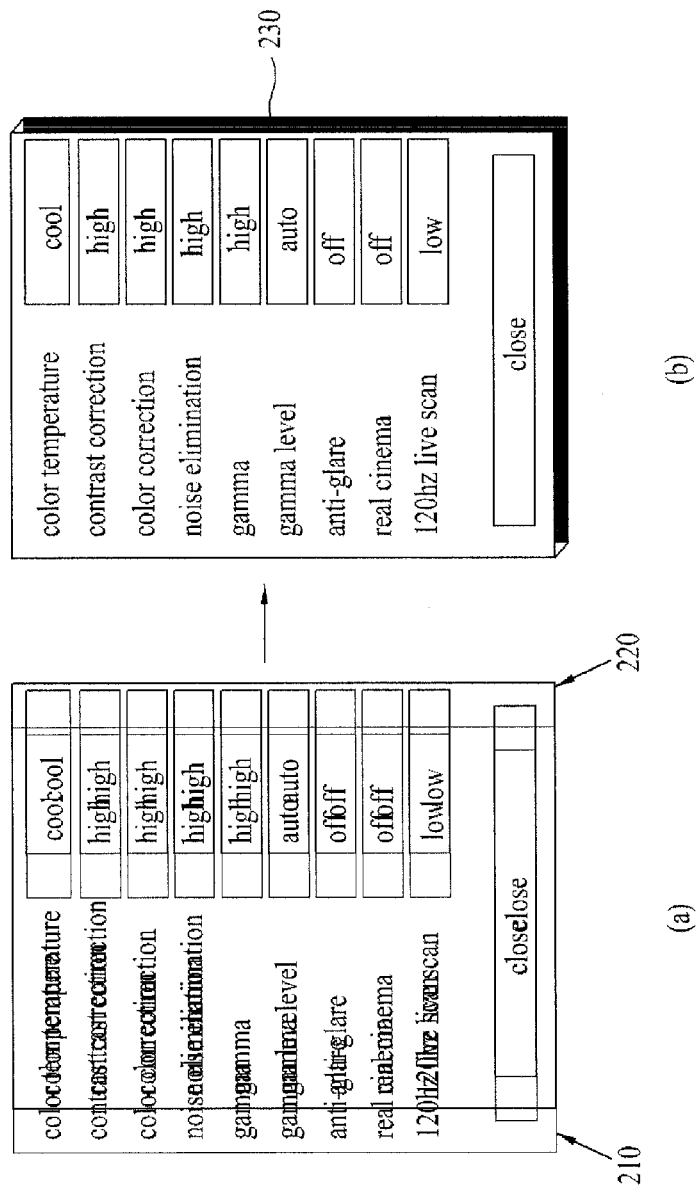
FIGS. 2 and 3 illustrate a method for controlling depth of a three-dimensional (3D) menu User Interface (UI) according to an exemplary embodiment of the present invention.
Figure 3:
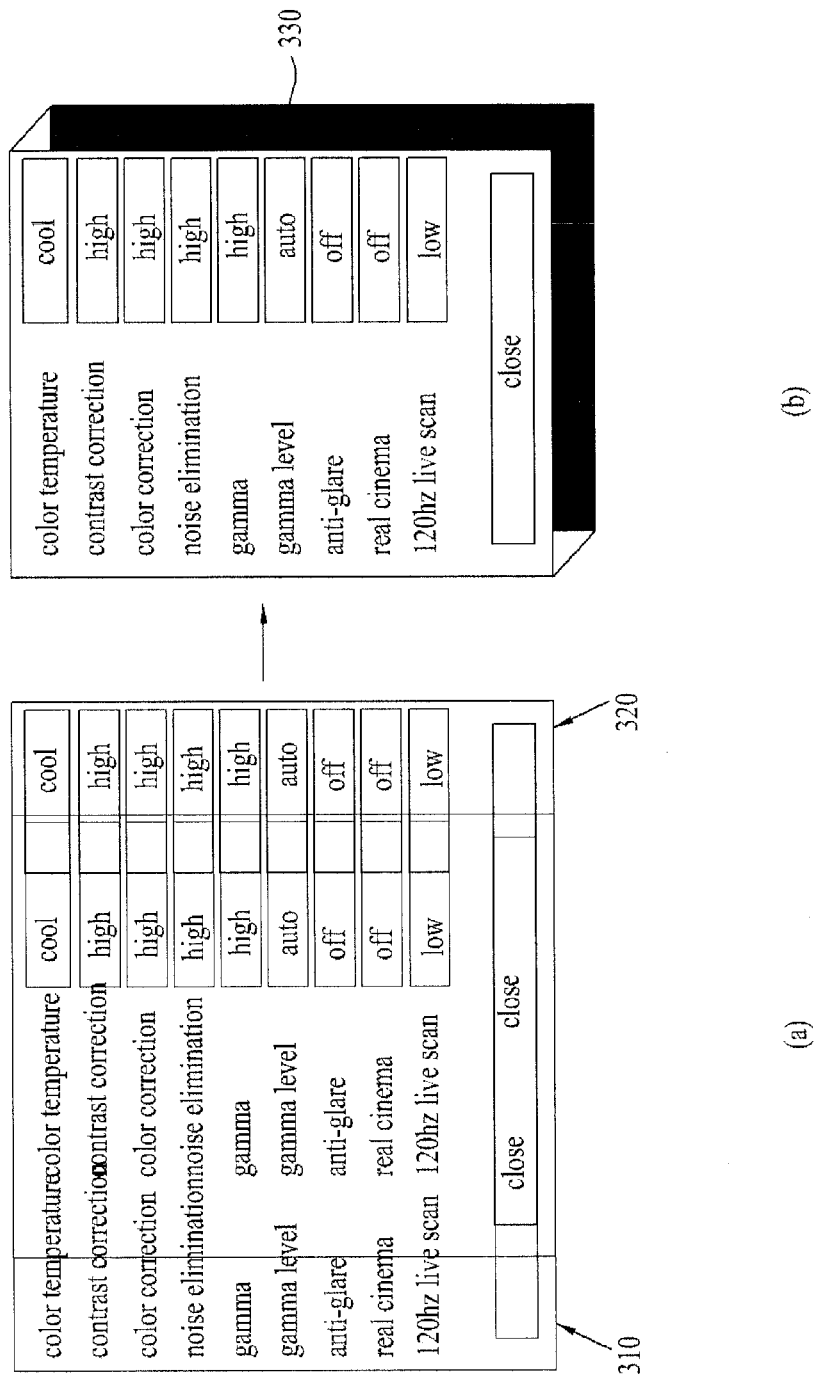

FIGS. 2 and 3 illustrate a method for controlling depth of a 3D menu UI according to an exemplary embodiment of the present invention. Other embodiments and configurations may also be within scope of the present invention.

The spacing between left image data 210 (or first image data) and right image data 220 (or second image data) that form a 3D menu UI in FIG. 2(a) is less than (or smaller than) the spacing between left image data 310 and right image data 320 that form a 3D menu UI in FIG. 3(a). In other words, the left image data 310 is laterally spaced apart from the right image data 320 in FIG. 3(a) by a greater distance than the left image data 210 is spaced apart from the right image data 220 in FIG. 2(a).

An image resulting from combining the left image data and the right image data may give a different sense of perspective to the human eye depending on spacing between the left image data and the right image data.

An image formed by combining the left image data 210 with the right image data 220 may look like a 3D menu UI 230 to the human eye based on spacing between the left image data 210 and the right image data 220 in FIG. 2(b).

An image formed by combining the left image data 310 with the right image data 320 may look like a 3D menu UI 330 to the human eye based on spacing between the left image data 310 and the right image data 320 in FIG. 3(b).

Compared with the 3D menu UI 230 shown in FIG. 2(b), the 3D menu UI 330 shown in FIG. 3(b) may be perceived to be near to the human eye. Because perceived depth of the 3D menu UI 330 is greater than perceived depth of the 3D menu UI 230, the 3D menu UI 330 may look more protruding than the 3D UI 230. Depth may correspond to a menu or menu item that is perceived to protrude outward from a display screen. The depth may be considered a perceived depth since it is a depth as viewed by a user or viewer.

FIG. 4 illustrates a method for controlling depth of a 3D menu UI according to an exemplary embodiment of the present invention. Other embodiments and configurations may also be within scope of the present invention.

The 3D menu UI shown in FIG. 4 may be similar or identical to the 3D menu UIs shown in FIGS. 2 and 3 in that it is configured based on a principle that depth varies with spacing between left image data 410 and right image data 420, except that only the left image data and right image data of a desired item are apart from each other rather than the left image data and right image data of all items being spaced from each other, as compared to FIGS. 2(a) and 3(a).

When a user selects, for example, a color calibration item from the menu UI, only the left image data and the right image data of the color calibration item may be laterally spaced from each other as shown in FIG. 4(a), while maintaining spacing for other items of the menu UI. As a result, a 3D menu UI may be configured as shown in FIG. 4(b).

Referring to FIG. 4(b), a sense of perceived depth may be provided only to the color calibration item, as compared to other menu items.

A 2D menu UI may be compared with a 3D menu UI based on the description of FIGS. 1 to 4.

Figure 5:
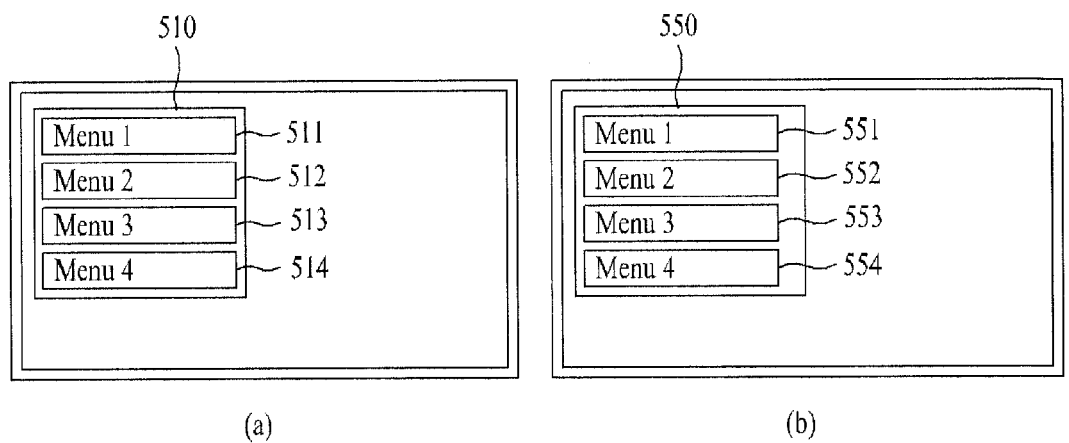
FIGS. 5 and 6 illustrate an exemplary two-dimensional (2D) menu UI and a 3D menu UI to which a depth is added according to an exemplary embodiment of the present invention.
Figure 6:
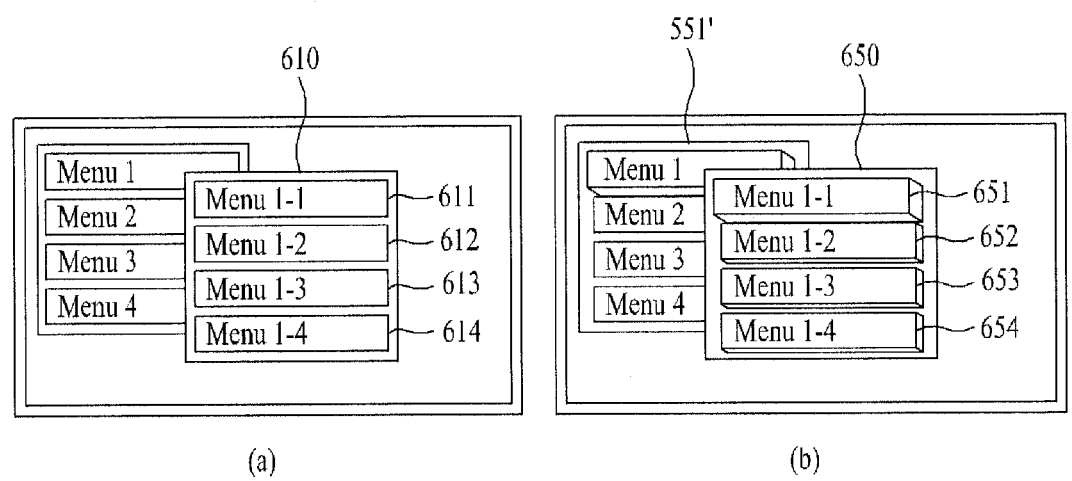

FIGS. 5 and 6 illustrate an exemplary 2D menu UI and a 3D menu UI to which a perceived depth is added according to an exemplary embodiment of the present invention. Other embodiments and configurations may also be within scope of the present invention. A depth may be a depth as perceived by a user or viewer based on the display screen.

FIG. 5 shows only a primary menu and FIG. 6 additionally shows a secondary menu for a primary menu item. The primary menu may be a basic menu in a highest layer (of a hierarchical manner), and the secondary menu may be a sub-menu of the primary menu.

FIG. 5(a) shows a 2D menu UI having only a primary menu 510. The primary menu 510 may list four menu items 511 to 514 (i.e., Menu 1 to Menu 4).

When the user selects Menu 1, the selection of Menu 1 may be shown by changing a color of Menu 1 or a shading of Menu 1 in the 2D menu UI. In presence of lower menu items of the selected menu item 511 (i.e., Menu 1), a secondary menu 610 may be displayed as shown in FIG. 6(a).

FIG. 5(b) shows a 3D menu UI that has only a primary menu 550 as in FIG. 5(a). Compared to the 2D menu UI shown in FIG. 5(a), menu items 551 to 554 (i.e., Menu 1 to Menu 4) of the primary menu 550 may have a specific perceived depth.

If the user selects Menu 1, Menu 1 (i.e., menu item 551' in FIG. 5(b)) may be highlighted with a specific depth, and thus may be perceived as protruding from the screen. If there are lower menu items of Menu 1, a secondary menu 650 may be displayed along with Menu 1 as shown in FIG. 6(b).

Menu items 651 to 654 of the secondary menu 650 (i.e., Menu 1-1 to Menu 1-4) may also have a specific perceived depth. The depth level of the secondary menu 650 may not be necessarily equal to the depth level of the primary menu 550. When the Menu 1-1 is selected, Menu 1-1 may have a different perceived depth level from the other menu items Menu 1-2, Menu 1-3 and Menu 1-4, as shown in FIG. 6(b).

A selected menu item may be identified, on the whole, in a color on a plane in the 2D menu UI, whereas a selected menu item may be indicated by a perceived depth that is realized based on spacing between the left image data and the right image data of the selected menu item in the 3D menu UI.

As shown in FIG. 6(b), the selected menu item may have a different depth level from the other menu items by differentiating spacing between the left image data and the right image data of the selected menu item. For example, as the left image data and the right image data are laterally spaced further apart from each other on the screen, a viewer may perceive a greater depth of the selected menu item. At the same time, a perceived depth of a non-selected menu item may be maintained by maintaining spacing of image data for the unselected menu item.

Figure 7:
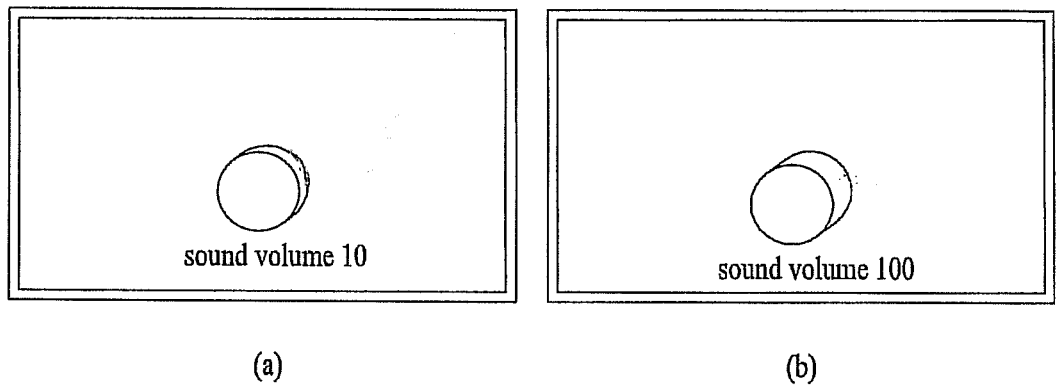
FIG. 7 illustrates a method for rendering a sense of volume according to a value in a 3D menu UI according to an exemplary embodiment of the present invention.

FIG. 7 illustrates a method for rendering a sense of volume according to a value in a 3D menu UI according to an exemplary embodiment of the present invention. Other embodiments and configurations may also be within scope of the present invention.

While many menu items may be changed in their values, the changing of sound volume may be provided as an example. FIG. 7 relates to changing a sound volume such as by use of a remote controller.

A sound volume may be set to a level 10 as shown in FIG. 7(a) and/or a sound volume may be set to a level 100 as shown in FIG. 7(b).

When the user changes the sound volume, circular cylinder (or cone-shaped) left image data and right image data representing the changed sound volume may be spaced from each other in an amount proportional to the sound volume variation. Thus, the image (or menu item) representing sound volume may be perceived by a viewer as protruding.

FIG. 8 illustrates a method for rendering a sense of volume according to a value in a 3D menu UI according to an exemplary embodiment of the present invention. Other embodiments and configurations may also be within scope of the present invention.

A sense of volume corresponding to a value may be expressed in a form of a circular cylinder image as shown in FIG. 7. In FIG. 8, the sense of volume may be represented in the form of a bar. FIG. 8 relates to changing a sound volume such as by use of a remote controller.

As shown in FIG. 8(a), a 2D menu 800 may include menu items such as Contrast, Brightness, Sharpness, Color Density, and/or Color in which the values may be represented by degrees of a color filled in bars.

As shown in FIG. 8(b), menu items of the menu 800 may have different perceived depth levels according to their values, so that the menu items may be perceived as protruding differently according to depth levels.

Assuming that senses of sound volume range from a level 0 to a level 100, a menu item may provide a sense of volume to the user (or viewer) as spacing between the left image data and the right image data of the menu item is set according to a value set for the menu item by the user, and thus perceived depth of the menu item may change based on the spacing. For example, as the value of a menu item increases, the menu item may get a higher depth level and may be perceived to be more protruding (as the left image data and the right image data are laterally spaced further apart from each other).

FIG. 8(c) shows a combination of FIGS. 8(a) and 8(b). A different perceived depth and color may be applied to each menu item based on their perspective values.

In FIG. 8(c), menu items may be configured so that they are represented with a same perceived depth but with different colors based on their specific values.

FIG. 8(d) may be an application of FIG. 7 in which menu items may be represented in the form of vertical bars, and not horizontal bars as shown in FIGS. 8(b) and 8(c).

While menu items may be represented in circular cylinders or bars, the menu items may take a form of a tetrahedron, and/or the like. That is, other embodiments may be provided.

FIGS. 9 and 10 illustrate a method for configuring a 3D menu UI so that the 3D menu UI may get a 3D effect gradually according to display time according to an exemplary embodiment of the present invention. Other embodiments and configurations may also be within scope of the present invention.

In FIG. 9, a weight may be applied to provide a gradual 3D effect to a 3D menu UI over time. The concept of weight may be introduced such that a menu item may reach a preset depth level stepwise over time rather than all at one time.

In FIGS. 9(a) to 9(d), weight 1 to weight 4 may be shown, respectively. For example, if an upper bound of a menu bar representing a 3D effect is 100, 100 depth levels may be defined, although a number of depth levels may vary when needed.

The weights may be pre-mapped to depth levels, and specifically weight 1 to depth level 25 (i.e., 3D effect level 25), weight 2 to depth level 50 (i.e., 3D effect level 50), weight 3 to depth level 75 (i.e., 3D effect level 75), and weight 4 to depth level 100 (i.e., 3D effect level 100).

When a menu item with weight 1 (i.e., 3D effect level 25) is selected, the menu item may be perceived by a viewer as being more protruding gradually as its depth increases from level 0 to level 25 stepwise, rather than reaching level 25 all at one time.

As circular left image data 1010 and circular right image data 1020 are spaced apart from each other and toward both sides (i.e., their lateral spacing is increased), as shown in FIG. 10(a), the resulting image 1030 may be perceived by a viewer as being more protruding gradually from a reference plane as shown in FIG. 10(b). In other words, a depth may be perceived by a viewer as the image appears to protrude out from the display screen.

Figure 11:
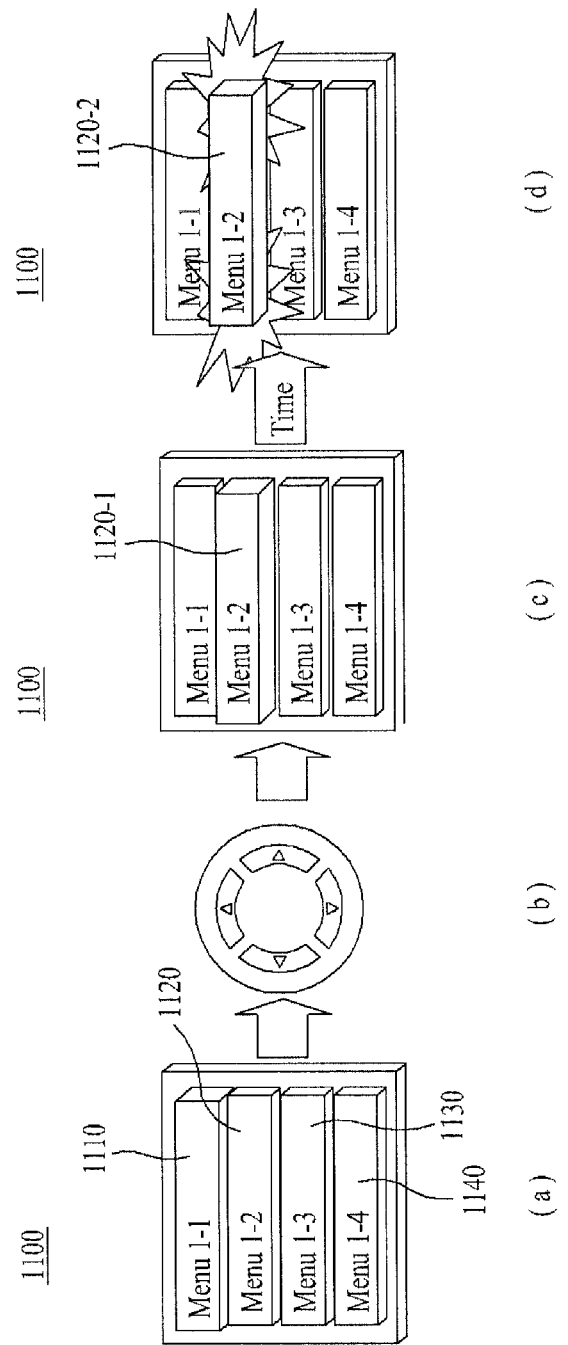
FIG. 11 illustrates a 3D menu UI to which a perceived depth is added according to an exemplary embodiment of the present invention.

FIG. 11 illustrates a 3D menu UI to which a perceived depth is added according to an exemplary embodiment of the present invention. Other embodiments and configurations may also be within scope of the present invention.

In FIG. 11, a selected menu item may be perceived by a viewer as being more protruding gradually over time.

FIG. 11(a) shows menu items 1110, 1120, 1130, 1140 (i.e., Menu 1-1 to Menu 1-4) in a menu 1100. Menu 1-1 may be selected and thus may get a different perceived depth from the other menu items 1120, 1130 and 1140.

If a menu item 1120-1 under Menu 1-1, namely Menu 1-2, is selected through a remote controller as shown in FIG. 11(b), a perceived depth of the previously selected menu item, Menu 1-1, may decrease to the level at which Menu 1-1 is in an inactive state, as shown in FIG. 11(c).

The selected menu item 1120-1, Menu 1-2, may have a perceived depth that increases gradually over time. Therefore, the resulting menu item 1120-2, Menu 1-2, may be perceived as being more protruding gradually in FIG. 11(d). As one example, the perceived depth may change for 0.1 to 1 second.

Signal Processing Apparatus

Figure 12:
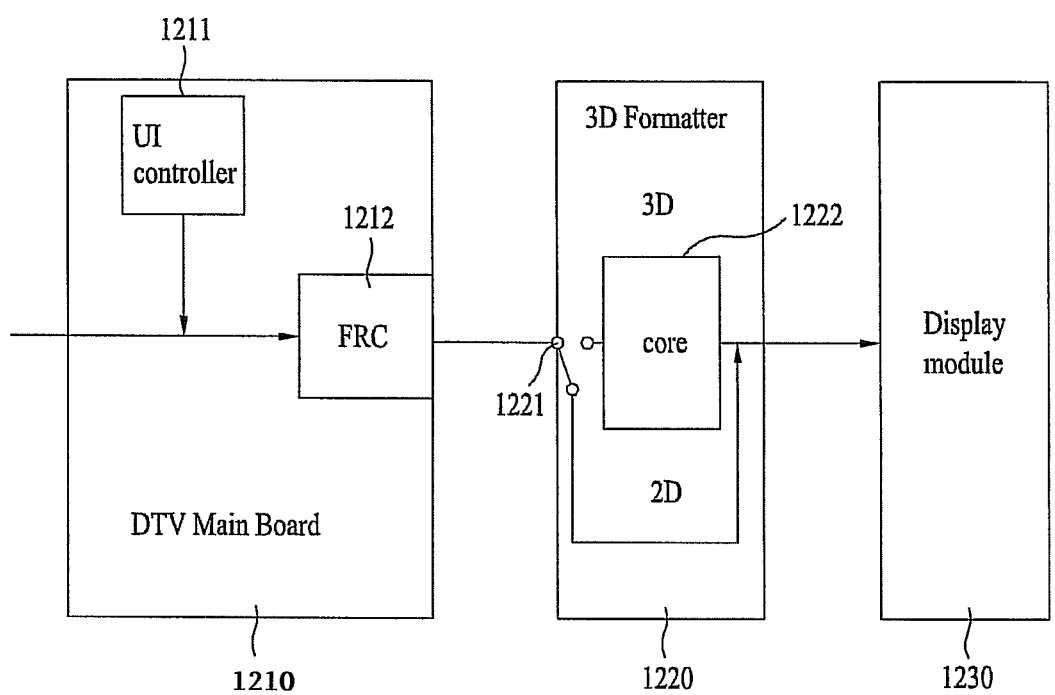
FIG. 12 is a block diagram of an image signal processing apparatus according to an exemplary embodiment of the present invention.

FIG. 12 is a block diagram of an image signal processing apparatus according to an exemplary embodiment of the present invention. Other embodiments and configurations may also be within scope of the present invention.

As shown in FIG. 12, a signal processing apparatus may include a Digital Television (DTV) main board 1210, a 3D formatter 1220 and a display module 1230.

The DTV main board 1210 may primarily process image data in a received signal. For example, the DTV main board 1210 may be a general DTV for processing a digital broadcast signal. The primary processing may refer to a series of processes including tuning of a channel carrying a digital broadcast signal including image data, reception of the digital broadcast signal through the tuned channel, demodulation and demultiplexing of the digital broadcast signal, and decoding the image data demultiplexed from the digital broadcast signal.

The DTV main board 1210 may include a UI controller 1211 for configuring a 3D menu UI and a Frame Rate Converter (FRC) 1212. The FRC 1212 may be configured separately from the DTV main board 1210. The FRC 1222 may be incorporated into the 3D formatter 1220 in a single module.

The UI controller 1211 may control a 3D menu UI to be configured on the display module 1230. As described above with reference to FIGS. 1 to 11, the UI controller 1211 may control the 3D menu UI to have a perceived depth, which may gradually change over time.

The FRC 1212 may process an input image signal and a control signal received from the UI controller 1211 in correspondence with an output frequency of the display module 1230. For example, if the image signal from the DTV main board 1210 is 60 Hz and an output frequency of the display module 1230 is 240 Hz, the FRC 1212 may process the image signal in a predetermined scheme such that frequency of the image signal becomes 240 Hz. The predetermined scheme may be temporal interpolation of an input image signal or simple repetition of an input image signal frame.

For ease of description, the output frequency of the display module 1230 is 240 Hz, although embodiments are not limited.

The temporal interpolation scheme may process an input 60 Hz image signal to a 240 Hz image signal by dividing the 60 Hz image signal by 4 (0, 0.25, 0.5, 0.75).

The simple repetition scheme may repeat each frame of the input 60 Hz image signal three times (i.e., four occurrences) so that the frame is 240 Hz.

The temporal interpolation or the simple repetition may be appropriately selected according to format of the input 3D image in the FRC 1212.

A description may now be provided of processing the 3D image data that was primarily processed in the DTV main board 1210.

The 3D formatter 1220 may include a switch 1221 and a core 1222 for configuring the 3D image data that was matched to the output frequency by the FRC 1212, according to an output format (i.e., a 3D format).

The switch 1221 may process 2D image data as well as 3D image data, received from the DTV main board 1210. Upon receipt of the 2D image data from the DTV main board 1210, the switch 1221 may switch the 2D image data to bypass the core 1222. On the other hand, if the received image data is of a 3D format, the switch 1221 may switch it to the core 1222.

The 3D formatter 1220 may output the configured 3D image data to the display module 1230. The 3D formatter 830 may generate a synchronization signal Vsync for the 3D image data, for synchronization during viewing, and output the synchronization signal V_sync to an InfraRed (IR) emitter (not shown) so that the user may view the image with shutter glasses (or googles) in synchronization to the display module 1230. The IR emitter may output the synchronization signal V_sync to a light receiver of the shutter glasses. The shutter glasses may be synchronized to the 3D image data output from the display 1230 by adjusting a shutter open period according to the synchronization signal V_sync.

Figure 13:
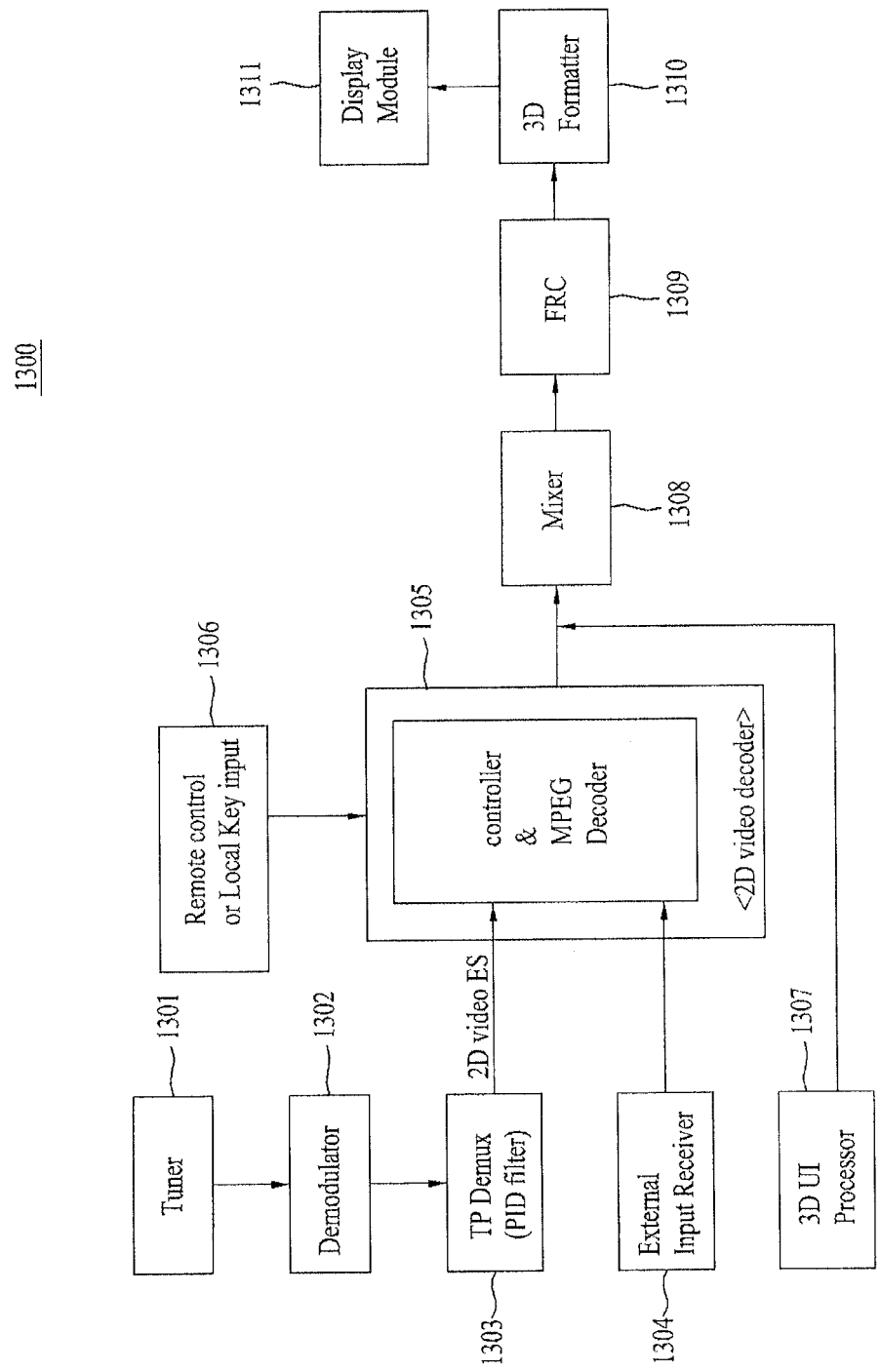
FIG. 13 is a block diagram of an image signal processing apparatus for configuring and outputting a 3D menu UI according to an exemplary embodiment of the present invention.

FIG. 13 is a block diagram of a signal processing apparatus for configuring and outputting a 3D menu UI according to an example embodiment the present invention. Other embodiments and configurations may also be within scope of the present invention.

As shown in FIG. 13, a signal processing apparatus 1300 may include a tuner 1301, a demodulator 1302, a Demultiplexer (DEMUX) 1303, an external input receiver 1304, a controller/Moving Picture Experts Group (MPEG) decoder 1305, a key input receiver 1306, a 3D UI processor 1307, a mixer 1308, an FRC 1309, a 3D formatter 1310, and a display module 1311. The signal processing apparatus may be a DTV, for example. The signal processing apparatus 1300 may include other components for processing a broadcast signal, in addition to the components shown in FIG. 13.

The tuner 1301 may tune a specific channel to receive a broadcast signal including an image data.

The demodulator 1302 may demodulate the received broadcast signal.

The DEMUX 1303 may demultiplex the demodulated broadcast signal by Packet Identifier (PID) filtering.

The external input receiver 1304 may be connected to an external input device in various manners and receive a signal from the external input device. The external input may be High Definition Multimedia Interface/Digital Video Interface (HDMI/DVI) input, Component input, or Red, Green, Blue (RGB) input.

The key input receiver 1306 may receive a user input through a remote controller or a local key.

The controller/MPEG decoder 1305 may decode the image data in the signal received via the tuner 1301 or the external input receiver 1304 and output a control signal according to a user command received from the key input receiver 1306.

The 3D UI processor 1307 may generate depth information and display time information about an UI and may make the UI look three-dimensional based on the generated depth information and the generated display time information about highlighted UI. That is, the 3D UI processor 1307 may increase visibility of a menu item selected from a hierarchical menu by differentiating perceived depth of the selected menu item over time. The 3D UI processor 1307 may maximize visibility of a 3D UI by differentiating perceived depth of the 3D UI based on a user setting value. A major function of the 3D UI processor 1307 may be to add weight information based on a UI bitmap and a depth to a 2D UI in order to give various senses of depth to the 2D UI.

The mixer 1308 may mix the output of the controller/MPEG decoder 1305 with the output of the 3D UI processor 1307 and output the mixed signal to the FRC 1309.

The FRC 1309 may convert a 2-channel Low Voltage Differential Signal (2CH LVDS) signal to a 120-Hz 4CH LVDS signal by motion compensation.

Upon receipt of 2D image data, the 3D formatter 1310 may simply output the received 2D image data. Upon receipt of 3D image data, the 3D formatter 1310 may mix left image data and right image data configuring of the 3D image data to an LVDS signal and output the LVDS signal through the display module 1311.

Figure 14:
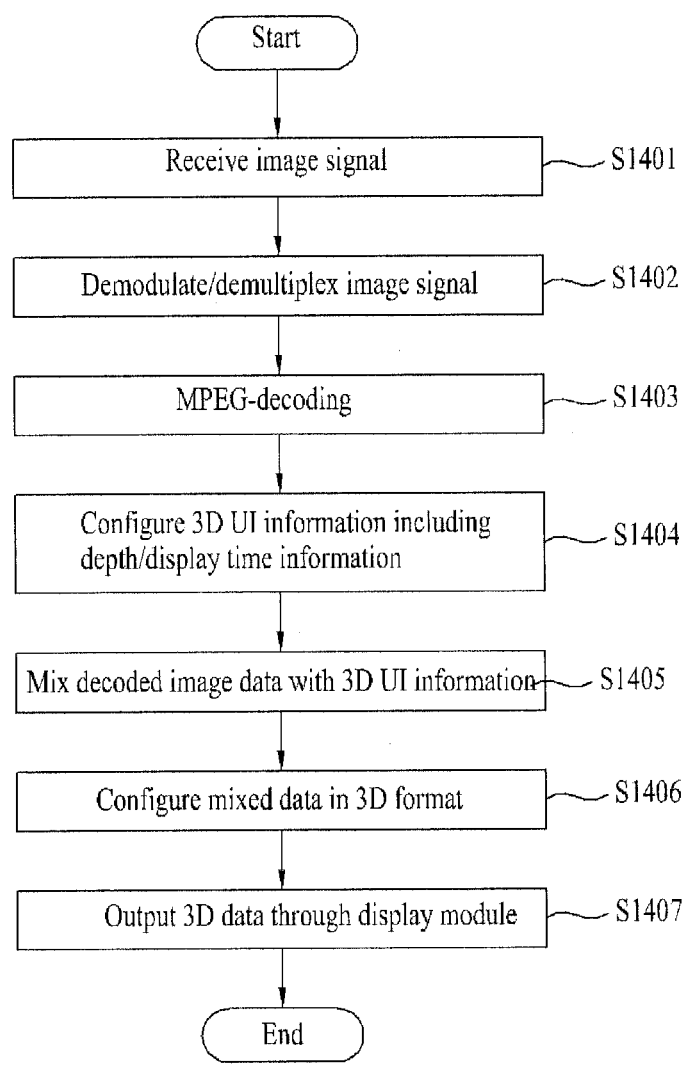
FIG. 14 is a flowchart illustrating a method for processing an image signal according to an exemplary embodiment of the present invention.

FIG. 14 is a flowchart illustrating a method for processing an image signal according to an exemplary embodiment of the present invention. Other embodiments and configurations may also be within scope of the present invention.

Referring to FIG. 14, the image signal may be received through an RF channel or as an external input in operation S1401. The received image signal may be demodulated and demultiplexed in operation S1402.

In operation S1403, the demultiplexed image signal may be MPEG-decoded.

3D UI information may be configured so that a UI may look three-dimensional based on depth information and display time information about UI information to be highlighted in operation S1404.

The configured 3D UI information may increase visibility of a menu item selected from a hierarchical menu by changing a perceived depth of the selected item over time, and maximize visibility of the 3D UI by differentiating the perceived depth of the 3D VI based on a user setting value.

In operation S1405, the MPEG-decoded image signal may be mixed with the configured 3D UI information. The mixed image signal and the 3D UI information may be configured in a 3D format in operation S1406 and may be output through the LCD module in operation S1407.

Accordingly, embodiments of the present invention may be directed to a 3D UI displaying method and an image signal processing apparatus for increasing visibility of an item selected from a hierarchical 3D UI by applying a different perceived depth level to the selected item in the 3D UI.

An embodiment of the present invention may provide a method and apparatus for indicating determined 3D contents distinguishably from other contents.

A method may be provided for displaying a User Interface (UI). The method may include (a) receiving, at a receiving unit, a request for displaying a UI including one or more items, (b) changing, at a UI controller, a (perceived) depth of the UI according to the request, and (c) displaying, at a display unit, the UI with the changed (perceived) depth.

The UI may include changed (perceived) depths of all items in the UI.

The UI may include only a changed (perceived) depth of a selected item in the UI.

The perceived depth of the UI may be changed by controlling a spacing between first image data and second image data that configure the UI.

The perceived depth of the UI may be changed stepwise over time.

The perceived depth of each item in the UI may be differentiated according to a value set for each item.

A method for displaying a User Interface (UI) may include (a) displaying, at a display unit, a first UI among hierarchical UIs, (b) changing, at a UI controller, a (perceived) depth of an item, upon selection of the item from the displayed first UI, and (c) displaying, at the display unit, the changed first UI and a second UI associated with the selected item, the second UI having a (perceived) depth different from a (perceived) depth of the first UI.

The perceived depth of the selected item in the first UI may be changed by adjusting a spacing between first image data and second image data that configure the first UI.

The perceived depth of the selected item in the first UI may be changed stepwise over time.

The perceived depth of the selected item in the first UI may be different from a perceived depth of other items in the first UI.

The perceived depth of the second 3D UI may be larger than the perceived depth of the first UI.

The method may further include changing, at the UI controller, a perceived depth of an item, upon selection of the item from the displayed second UI and displaying, at the display unit, the second UI including the item with the changed perceived depth.

The perceived depth of each item in the first UI and the second UI may be differentiated based on a value set for the item.

An apparatus may be provided for processing a signal. The apparatus may include a receiving unit for receiving a request for displaying a User Interface (UI) including one or more items, a UI controller for generating a control signal according to the request, to change a predetermined depth to a UI, a formatter for configuring the UI to have the predetermined depth in a three-dimensional (3D) format and a display unit for displaying the UI configured in the 3D format.

The UI controller may control a spacing between first image data and second image data that configure the UI so that the UI has the predetermined depth.

The UI controller may control the spacing stepwise over time.

The UI controller may control a perceived depth of each item in the UI to be different based on a value set for the item.

Upon receipt of a request for selecting a specific item in the displayed UI from the receiver, the UI controller may control a perceived depth of the selected specific item to be different from other items in the UI.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a television, the method comprising:
receiving a broadcast signal including an image signal through an RF channel or an external input;
demodulating and demultiplexing the received image signal;
decoding the demultiplexed image signal;
receiving a first control signal for requesting a three-dimensional (3D) user interface (UI) that includes a plurality of menu items;
generating first left image data and first right image data for the requested 3D UI based on a first depth value;
mixing the decoded image signal with the generated 3D UI;
converting a frame rate of the mixed image signal and generated 3D UI in accordance with an output frequency of the television;
displaying, on a screen, the converted image signal with the 3D UI;
receiving a second control signal for adjusting a sound volume level from a current sound volume level of a sound volume menu item on the 3D U, wherein the sound volume menu item is displayed in a form of a circular cylinder;
generating second left image data and second right image data for the sound volume menu item in response to the second control signal based on changing a spacing between the second left image data and the second right image data referring to the adjusted sound volume level, and generating sound volume data and color data corresponding to the generated second left image data and the generated right image data for the sound volume menu item; and outputting the sound volume menu item using the generated second left image data and the generated second right image data with the generated sound volume data and the generated color data, wherein the outputted sound volume menu item, the outputted sound volume data and the outputted color data are gradually changed referring to both the received second control signal and a weight value that is previously set to each of the sound volume level in a predetermined time.

2. The method of claim 1, wherein the weight value is pre-mapped to a depth level related to the sound volume level.

3. The method of claim 1, wherein the outputted sound volume menu item gradually protrudes from a reference plane of the screen.

4. The method of claim 3, wherein the outputted sound volume menu item is outputted stepwise over time.

5. The method of claim 1, wherein the received signal is a signal received from a remote controller.

* * * * *